(12) United States Patent
Insley et al.

(10) Patent No.: US 7,069,476 B1
(45) Date of Patent: Jun. 27, 2006

(54) METHOD AND APPARATUS TO RELEASE A SERIAL BUS FROM A SUSPENDED STATE

(75) Inventors: Mark Insley, Sunnyvale, CA (US); Steve Valin, Nevada City, CA (US); Allen Kilbourne, Tracy, CA (US); R. Guy Lauterbach, Penn Valley, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 694 days.

(21) Appl. No.: 10/219,729

(22) Filed: Aug. 15, 2002

(51) Int. Cl.
*G06F 11/00* (2006.01)

(52) U.S. Cl. .......................... 714/43; 710/110; 710/314
(58) Field of Classification Search .................. 714/43, 714/34
See application file for complete search history.

(56) References Cited

U.S. PATENT DOCUMENTS 6,092,138 A * 7/2000 Schutte ....................... 710/113
6,338,150 B1 * 1/2002 Johnson et al. ................ 714/39
6,842,806 B1 * 1/2005 Ervin .......................... 710/110

OTHER PUBLICATIONS

Phillips Semiconductor, The I²C-Bus Specification, Version 2.1, Jan. 2000, 46 pages.

* cited by examiner

*Primary Examiner*—Robert Beausoliel
*Assistant Examiner*—Yolanda L Wilson
(74) *Attorney, Agent, or Firm*—John R. Ley

(57) ABSTRACT

A suspended or stuck condition of a serial bus controller is released by applying an artificial clock signal to the stuck bus controller in place of the normally applied clock signal. The artificial clock signal causes the stuck controller to advance in a communication transaction which was in progress when the stuck condition occurred, until a data signal is supplied at a logical level which permits the initiation of another transaction in accordance with the serial communication protocol of the bus. The ability to release the stuck condition avoids losing important data and other information that would be lost if the stuck condition was released by performing a reset of the stuck controller or the component to which it is connected.

27 Claims, 5 Drawing Sheets

METHOD AND APPARATUS TO RELEASE A SERIAL BUS FROM A SUSPENDED STATE

This invention relates to a communication of data over a bus between electronic components. More particularly to this invention relates to a new and improved method and apparatus for releasing a serial bus from a stuck state of suspended functionality arising from resetting a master bus controller during a transaction in progress. Resetting the master controller suspends the operation of the slave bus controller with a logical level of a data signal on a data line of the serial bus which thereafter prevents use of the entire serial bus. While the stuck condition of the bus can be released by a power cycle reset, i.e. terminating power to the entire system of which the serial bus is a part, the present invention offers a capability of releasing the stuck condition without a power cycle reset, thereby preserving the data and other valuable information that would otherwise be lost by performing a power cycle reset.

BACKGROUND OF THE INVENTION

A typical modern digital electronic device uses many individual self-contained functional blocks or components all of which must cooperatively interact to perform the overall function of the device. It is frequently the case that each of these functional components is assembled by interconnecting a set of integrated circuits, and the integrated circuits autonomously execute the function of that particular component. The proper functionality of the entire electronic device requires coordinated functionality from each of the functional components. Coordinated functionality is achieved by communicating data and control information between the functional components over a bus.

A parallel bus is typically used to connect those functional components which require intensive communication of data, such as a processor and memory. A parallel bus includes a relatively large number of individual conductors, for example 64, 128 or more conductors, upon which signals are simultaneously presented. The simultaneous or parallel presentation of a large number of signals on the parallel bus on a repetitive basis quickly communicates a large amount of data. On the other hand, many of the other functional components of an electronic device do not require the communication of large amounts of data on a continuous basis. It is common practice to connect such less communication-intensive components by a serial bus.

The typical serial bus involves only two conductors, one which carries a clock signal and the other which carries a data signal. The data is presented as a single signal or bit occurring during a time interval defined by the clock signal. Because only a single bit is applied at one time on the serial bus, more time is required to communicate information. However, since the typical functional components connected by the serial bus do not require a large amount of data or control information, or since the time required to communicate the data and control information is not critical, the use of the serial bus is not a particular detriment in the circumstance. In addition to its relative simplicity, the data and clock conductors of a serial bus consume less space and require a lesser number of electrical connections to the functional components, making the layout and organization of the device easier and more compact. A serial bus also makes it relatively easy to evolve electronic devices into improved versions by substituting improved functional components for the previous components while retaining the interconnection and the interaction with the other components through the serial bus.

There are many other advantages and reasons for using a serial bus, and those reasons and advantages have been endorsed by the widespread acceptance and use of serial busses in electronic devices. One type of serial bus, known by the trademark "I$^2$C," has been used so extensively that it has almost become the de facto standard for a serial bus. Other serial buses which have a related or similar functionality are designated by the trademarks "SMBus" and "DDC2." Details concerning these different serial buses are described in widely-disseminated specifications published by their respectively different developers.

SUMMARY OF THE INVENTION

It has been discovered that some slave bus controllers of a serial bus may enter a functionally suspended state, i.e. a "stuck" state, which disables the entire serial bus, if a reset is applied to a master bus controller at a time during an ongoing transaction when a slave bus controller is not reset but remains functional and supplies a logical low level signal on the data conductor. Resetting the master controller terminates its delivery of the clock signal to the slave controller, and without the clock signal the slave controller persists in maintaining the logical low level signal on the data conductor. The persistent logical low level signal on the data conductor prevents a master controller from initiating a new transaction, because the signals on both the data and clock conductors must be at a logical high state to signify an idle bus condition as a prerequisite to the master controller starting another transaction. The inability of a master controller to initiate another transaction and lack of the clock signal to the stuck slave controller prevent further use of the serial bus. The other bus controllers connected on the serial bus will not have recognized the completion of the uncompleted transaction in progress when the stuck condition occurred, so the other bus controllers will not initiate a transaction. The bus enters a suspended state in which the transaction in progress has not completed, and it is impossible to complete that transaction without the application of a clock signal, which a master controller will not generate because the logical low level of the data signal prevents it from doing so.

There has been some previous recognition that a problem with some types of serial buses could occur under certain reset conditions, but insofar as the present inventors are aware, there has been no previous understanding of the cause of this problem and no previous recognition that the problem is caused by the application of a reset signal to the master controller at a time when the slave controller is supplying a logical low level data signal. However, it has been previously recognized that it is desirable to reset slave controllers under conditions where they are part of an ongoing transaction but no signals have been communicated in the transaction for a predetermined amount of time. This reset functionality is generic to a variety of different problems and does not signify recognition of the problem addressed by the present invention. Moreover, the reset capability is available only in a class of slave controllers which have this capability. Many slave controllers available for use on serial buses do not have any such reset capability.

The invention involves to releasing a stuck condition of a serial bus of the type in which a clock signal is normally applied when performing a communication transaction, by detecting a stuck condition of a bus controller and applying an artificial clock signal to the clock conductor in place of the normally applied clock signal. The artificial clock signal causes the stuck controller to supply the next data signal of the transaction which was in progress when the stuck condition occurred. The artificial clock signal is supplied in this manner until the stuck controller supplies a logical high level signal. At that time, the data and clock conductors of the serial bus both present logical high level signals, thereby indicating an idle state which permits a master controller to assume normal functionality, perform normal serial bus transactions and resume the normal operation of the serial bus. Although the data of the stuck transaction will be incomplete or corrupted, normal error recognition techniques will indicate that the transaction needs to be retried and completed with the properly functioning serial bus. More importantly, it will not be necessary to reset for the entire electronic device or the stuck slave controller to clear the stuck condition, thereby preserving the data and other control information which would otherwise be lost as a result of performing a reset.

One aspect of the invention is a method of releasing a bus controller from a stuck condition. The serial bus is of the type having a plurality of bus controllers and a clock signal is normally applied in coordination with a data signal when performing a transaction in accordance with a serial bus communication protocol. The method involves detecting a stuck condition where one bus controller is continuously applying a data signal and the clock signal is absent, and applying an artificial clock signal to the stuck bus controller to advance the data signal supplied by the stuck bus controller to a predetermined logical level at which the communication protocol permits a normal serial bus transaction to initiate.

Another aspect of the invention involves releasing a slave bus controller from a stuck condition in a serial bus of the type in which pulses of a normally applied clock signal are applied by a master bus controller in time synchronism with logical bits of a data signal supplied by the slave bus controller, when performing a transaction between the master and slave controllers in accordance with a serial bus communication protocol governing transactions on the serial bus. The method involves detecting the stuck condition of the slave bus controller arising from abnormally terminating the clock signal normally supplied by the master controller to the slave controller while a transaction is in progress and uncompleted, applying an artificial clock signal to the stuck slave bus controller in place of the normally applied clock signal upon detecting the stuck condition, and applying the artificial clock signal to the stuck slave bus controller to advance the data signal supplied by the stuck slave bus controller in the uncompleted transaction to a predetermined logical level at which the communication protocol permits a normal serial bus transaction to initiate.

A further aspect of the invention relates to improvements in a serial bus of the type in which pulses of a normally applied clock signal occur in time synchronism with logical bits of a data signal when performing a transaction communicated between two bus controllers of the serial bus. The improvement involves releasing one bus controller from a stuck condition occurring during a transaction. An artificial clock signal generator is connected, to a bus controller and is operative to generate pulses of the artificial clock signal and to apply the pulses of the artificial clock signal to the stuck bus controller in place of the normally applied clock signal upon activation of the artificial clock signal generator. Detection circuitry is connected to a bus controller and receives logical bits of the data signal communicated between the two bus controllers during the transaction. The detection circuitry detects an absence of change in the logical level of the data signal to identify the stuck bus condition. The detection circuitry is connected to the artificial clock signal generator to activate the artificial clock signal generator to cause it to generate the pulses of the artificial clock signal in response to detecting the stuck bus condition.

A more complete appreciation of the present invention and its scope may be obtained from the accompanying drawings, which are briefly summarized below, from the following detailed description of presently preferred embodiments of the invention, and from the appended claims.

DETAILED DESCRIPTION

Figure 1:
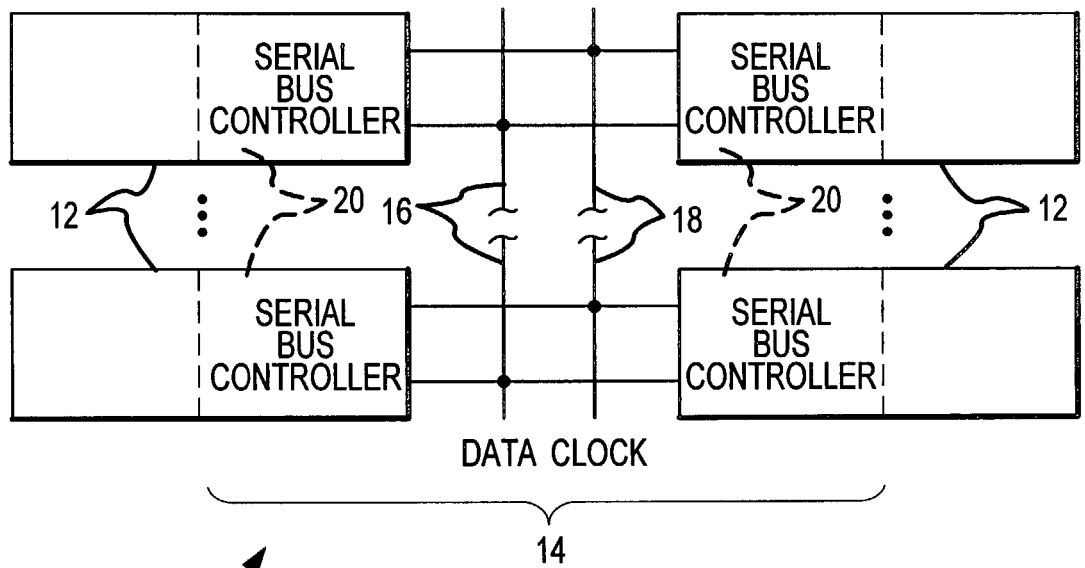
FIG. 1 is a block diagram of a generic electronic device having a plurality of functional components connected by a serial bus which incorporates the present invention.

An exemplary and generalized digital electronic device 10 in which the present invention is incorporated as shown in FIG. 1. The device 10 includes a plurality of functional blocks or components 12 which are electrically interconnected by a serial bus 14. The serial bus 14 includes a data signal conductor 16 and a clock signal conductor 18, as well as a serial bus controller 20 associated with each component 12. The serial bus controller 20 is typically a separate integrated circuit which is electrically connected as one part of each functional component 12, but the bus controller 20 may also be implemented by interface hardware (not shown) that is controlled by a primary component controller 22 (FIG. 2) of the component 12.

Figure 2:
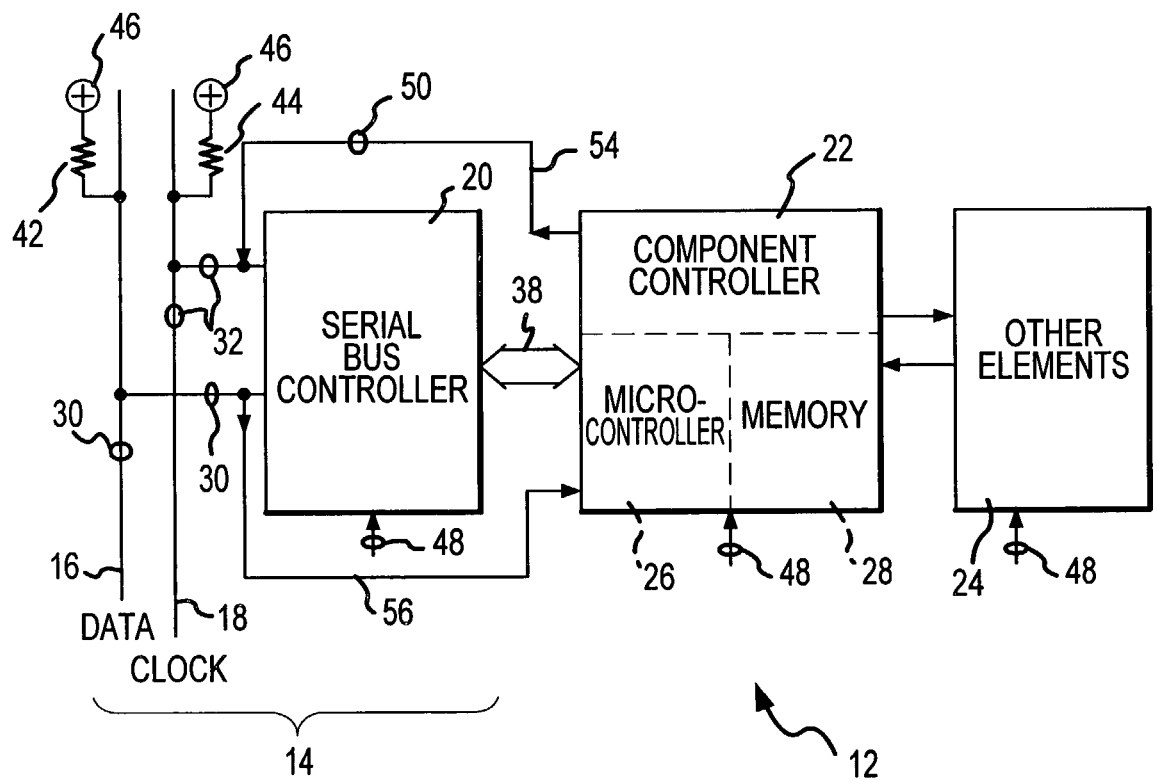
FIG. 2 is a block diagram of one of the functional components of the device shown in FIG. 1, including more detailed elements of the serial bus which incorporates the present invention.

As shown in FIG. 2, the data and clock conductors 16 and 18, respectively, are electrically connected to the bus controller 20 of each component 12. The bus controller 20 is electrically connected to a primary component controller 22 of the component 12. The component controller 22 is connected to the other elements, 24 of the component 12. The component controller 22 controls the other elements 24 to perform the specific functions of the component 12. Two bus controllers 20, one a master bus controller and the other a slave bus controller, communicate data signals between each other in a normal serial bus communication transaction. The data signals constitute data and control information which is transferred between the bus controllers 20 and the component controllers 22 to which they are connected. The data and control information communicated in the transactions establishes and controls the coordinated functionality of the components 12 in the device 10 (FIG. 1). Each component controller 22 includes a typical microprocessor or microcontroller 26 which executes the functionality of the component 12 as defined by programmed instructions contained in a memory 28, or the component controller 22 may be logic (not shown) programmed as a state machine to execute the functionality of the component 12.

Each bus controller 20 also includes a microprocessor or microcontroller and associated memory or other programmed logic (none of which is shown) which establishes and executes a serial bus communication protocol that governs the communication of transactions on the serial bus 14. The communication protocol also specifically, governs the delivery of a data signal 30 on the data conductor 16 in time synchronization with a clock signal 32 applied on the clock conductor 18, to establish particular conditions recognized by the bus controllers 20 as defining aspects of a transaction. For example, the aspects of the transaction may involve a start, data transfer, acknowledgment, stop, and arbitration, as well as an idle bus condition which permits the initiation of a transaction.

One bus controller 20 functions as a transmitter to send the data signal 30, and another bus controller 20 functions as a receiver to receive the data signal 30. The controller 20 which initiates the transfer of the data signal 30 in a transaction is termed the "master," and the controller 20 which responds in the transaction is termed the "slave." In simpler and less extensive implementations of the serial bus 14, only one bus controller 20 has the capability to function as the master and the other bus controllers always function as slaves. This type of arrangement is known as a single master serial bus. Single master serial buses are probably used in approximately 80 percent of the applications of the typical serial bus. In more complex implementations of the serial bus 14, more than one bus controller 20 has the capability to function as a master and all of the bus controllers 20 have the capability to function as slaves at different times in different transactions. This type of arrangement is known as a multi-master serial bus.

The master controller initiates an arbitration procedure to claim exclusive use of the serial bus to perform a transaction. The master then controls the bus, and only the master is capable of initiating a transaction. Address signals sent by the master designate the slave controller which is to participate in the transaction. After the transaction is complete, the master releases exclusive use of the bus. In a single master serial bus, the master will initiate each subsequent transaction in the same way, either to the same or to a different slave controller. In a multi-master serial bus, any one master may contend for exclusive use of the bus. Competing contentions from multiple masters are arbitrated to grant exclusive use of the serial bus to only one master for the purpose of performing one transaction. After completing that one transaction, another arbitration between competing masters occurs. Any bus controller which is neither a master nor a slave during any transaction ignores the signals which are transferred between the master and slave during that transaction, and those other bus controllers will not become active until the transaction has been completed.

The master bus controller 20 generates the clock signal 32 to permit the transfer of the data signal 30 during the communication transaction. For a transaction which involves a transfer of the data signal from the master controller to the slave controller, the master transmits the data signal 30 on the data conductor 16 as well as the clock signal 32 on the clock conductor 18. The data signal 30 is transmitted in time coordination or synchronization with the clock signal 32. For a transaction which involves a transfer of the data signal from the slave to the master, the master transmits the clock signal 32 on the clock conductor 18 while the slave controller the transmits the data signal 30 on the data conductor 16. The slave transmits the data signal in time coordination or synchronization with the clock signal 32 supplied by the master. A transaction is completed by the receiver controller transmitting an, acknowledgment signal to the transmitter controller, indicating successful receipt of the data signal transferred during the transaction. A transaction is terminated, and exclusive use of the serial bus is relinquished, upon the master transmitting a stop signal represented by the relative timing of transitions of the clock and data signals.

Figure 3:
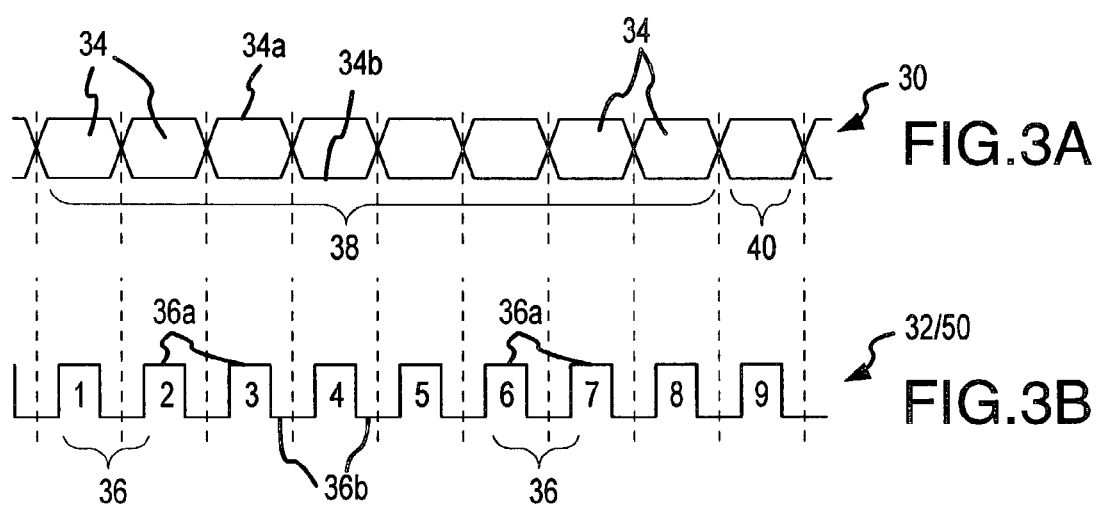
FIGS. 3A and 3B are waveform diagrams, shown on a synchronized or coordinated relative time basis, which illustrate various aspects of the data and clock signals involved in performing a single transaction communicated on the serial bus shown in FIGS. 1 and 2.

Details of the data signal 30, the clock signal 32 and a single transaction between master and slave controllers 20 of the serial bus 14 are shown in FIGS. 3A and 3B. The data signal 30 includes a series or sequence of single data bits 34 shown in FIG. 3A. Each single data bit 34 may either be a digital logic high level signal 34a or a digital logic low level signal 34b. Each data bit 34a or 34b is delivered in time synchronization or coordination with and during the occurrence of a cycle 36 of the clock signal 32. Each clock cycle 36 includes a single logical high level pulse 36a followed by an interval 36b during which the signal is at a logical low level, as shown in FIG. 3B. One pulse 36a and one low interval 36b constitute one bus clock cycle 36. The bus clock cycles 36 normally occur at a repetitive and consistent frequency, although the serial bus protocol may provide that the bus clock cycles be stretched in time in order to accomplish a transaction involving a slow-performing slave controller.

In accordance with the serial bus communication protocol, each transaction involves the transfer of the data signal 30. The data signal 30 consists of nine serial bits, of which the first eight data bits 34 constitute one 8-bit byte 38 of data and the last or ninth bit 40 of which constitutes the acknowledgment signal. The data bits 34 are sent by the master controller during write transactions and by the slave controller during read transactions. The acknowledgment bit 40 is sent by whichever one of the master or slave controllers that receives the data bits 34. The clock pulses 36a are supplied by the master during the entire transaction, including the ninth acknowledge bit 40. The first eight serial data bits 34 occupy logical high level or logical low level values in accordance with the byte 38 of information transferred. The acknowledgment bit 40 may either be a logical high level or a logical low level depending upon different status and operational conditions permitted under the serial bus communication protocol.

The bits 34 and 40 of the data signal 30 are only recognized during the pulses 36a when the clock signal 32 is at a logical high level. Once a transaction has been initiated, the bits 34 and 40 are permitted to change logical levels only during the low interval 36b of a clock cycle 36. The bus clock signal 32 must transition to the low interval 36b of the clock cycle 36 in order for a logical level of the data signal 30 to change or increment for each new data bit 34. Before initiating a transaction, the master controller signals a start condition for the transaction by creating a logical low level on the data conductor 16 while the logical level on the clock conductor 18 remains high. The transaction is then initiated. Lastly, the master controller signals a stop condition after the transaction by transitioning the logical signal level on the data conductor 16 from low to high while the logical level on the clock conductor 18 is low. The stop condition signifies that the master has released exclusive use of the bus, so subsequent transactions can thereafter be performed.

Until a transaction is acknowledged by the delivery and recognition of the ninth acknowledge bit 40 and until the master controller delivers the stop signal to signify release of the bus, all of the other bus controllers of the serial bus 14 which are not participating in the transaction are in a busy state. Moreover, whenever the data signal 30 or the clock signal 32 occupies a logical low level 34b or 36b, all of the bus controllers consider the serial bus 14 to be in a busy state. No master bus controller will attempt to initiate any transaction when the serial bus 14 when in the busy state. In order for a master to attempt to initiate a transaction, the serial bus must be in an idle state in which the data signal 30 and the clock signal 32 both occupy a logical high level 34a and 36a. If either the data signal 30 or the clock signal 32 does not occupy a logical high level, the master will not recognize an idle state of the bus and will not attempt to initiate a transaction.

The signal levels on both the data and clock conductors 16 and 18 under nonuse or idle conditions, when the serial bus 14 is available to perform a transaction, are at the logical high level. The logical high signal level is achieved by connecting the data and clock conductors 16 and 18 through resistors 42 and 44, respectively, to a positive power supply terminal 46, as shown in FIG. 2. Each bus controller 20 is connected to the data and clock conductors 16 and 18 by a driver transistor or switch which has a conventional open-drain configuration. The open-drain configuration is a wired-or connection of all of the driver transistors of all of the bus controllers connected to each of the data and clock conductors 16 and 18, respectively. So long as none of the driver transistors are conductive, the signal level on the data or clock conductor is at the logical high level. However, if any one of the driver transistors becomes conductive, the signal level on the data or clock conductor is immediately pulled or driven to the logical low level. The current conducted by the conductive driver transistor through the conductor 16 or 18 flows through a resistor 42 or 44, thereby reducing the signal level on the conductor to the logical low level.

In addition to performing the functions of the serial bus communication protocol, each receiver controller 20 recognizes the individual data bits 34 and the acknowledge bit 40 of the data signal 30 by their time synchronized relationship with the pulses 36a of the clock signal 32 (FIGS. 3A and 3B), assembles the series of eight data bits 34 into a corresponding parallel-bit byte 38 and applies the assembled data byte 38 to the connected component controller 22, as shown in FIG. 2. Similarly, each transmitter bus controller 20 disassembles each parallel eight bit byte 38 supplied by the connected component controller 22 into the series of eight single data bits 34 of each single byte transaction, and sequentially transmits the eight single data bits 34 over the data conductor 16 in time synchronization with the pulses 36a of the clock signal 32. The acknowledge bit 40 is also transmitted in time synchronization with the pulses 36a of the clock signal 32.

In most electronic devices 10 (FIG. 1) it is typical that the elements of the functional component 12 are placed into known initial states in response to a "soft" or "hard" reset signal 48. In general, a "soft" a reset signal 48 is usually delivered to reset some or all of the components 12 of the device 10 (FIG. 1) without removing electrical power from those components. In this regard, the soft reset signal 48 is distinguishable from a power cycle reset in which the electrical power to all the components 12 of the device 10 (FIG. 1) is terminated and then followed by reapplying electrical power to the components. A power cycle reset is typically referred to as the "hard" reset. All components 12 of the electronic device 10 (FIG. 1), including the bus controllers 20 (FIG. 2), respond to a hard reset by initializing into a known state.

It has been discovered that applying a reset signal 48 to a master bus controller 20 which is performing a transaction with a slave controller, at an instant in time when the slave controller is not reset but is driving the data signal 30 in a digital low state 36b (FIG. 3B), will cause the slave controller to become "stuck" in a state of maintaining the logical low level signal on the data conductor 16. The reset of the master bus controller has caused it cease delivering the clock signal 32 to the slave controller while the slave controller remains active. In the absence of further pulses 36a (FIG. 3B) of the clock signal 32, the slave controller cannot progress to transmitting the next data bit 34 (FIG. 3A) of the transaction and therefore cannot complete the transaction in progress when the stuck condition occurred. Instead, the slave controller continues to supply a continuous low level as the data signal 30.

Many slave controllers have no internal capability of recognizing their own stuck state because the communication protocol of the serial bus permits stretching or time-elongating the cycles 36 of the clock signal 32. The internal functionality of the stuck slave controller interprets the absence of the clock signal 32 as a time-stretch of the one cycle 36 of the clock signal. The reset has affected only the master bus controller of a different component 12 of the device 10, not the stuck slave controller, so the reset to the master controller has had no effect on reset in the slave controller. Instead, the slave controller remains stuck in a state of not being able to progress the transaction to completion by transmitting the remaining data bits 34 and acknowledge bit 40 of the data signal 30. In this stuck state and without internal time-out reset capability, the slave controller will continue to wait indefinitely for the next pulse 36a of clock signal 32, while maintaining a logical low data signal 30 on the data conductor 16.

The reset to the master controller has caused it to reinitialize to a state in which it is ready to initiate a transaction. However, the reset master bus controller cannot initiate a transaction by delivering the clock signal because the communication protocol permits the initiation of a transaction only when the bus is in an idle state. An idle state is signified by logical high levels of both the data and clock signals 30 and 32. However, the stuck slave controller is holding the data signal 30 at a logical low level, thereby preventing the reset master controller, or any other master controller on a multi-master serial bus, from initiating another transaction. Thus, without a master controller delivering clock signals to the stuck slave controller, the slave controller is unable to change the logical low level of the data signal; and with the logical low level of the data signal, a master controller is prevented from initiating a transaction which would deliver clock pulses. Consequently, the entire serial bus is in a suspended state of functionality as a result of the stuck slave controller and the inability of any master controller to deliver the clock signal.

The suspended state of functionality will continue indefinitely until the stuck slave controller is reset. Generally speaking, the only way to reset the stuck slave controller which has no internal time-out reset capability is to perform a reset on the entire electronic device or on the component 12 (FIG. 2) having the stuck slave controller. In most if not all cases, resetting the entire electronic device 10 or the component 12 having the stuck slave controller would result in the loss of data, particularly if the other elements 24 of the functional component 12 included memory and the information in the memory was not in a safe state at the time of the reset. Indeed, even though some functional components 12 which utilize memory as the other elements 24 may have the capability to place the memory into a safe state and make the memory nonvolatile in response to the reset, the stuck serial bus 14 prevents the communication of the information necessary to invoke the nonvolatile, safe state of that memory.

The present invention involves releasing the bus controller 20 from the stuck state without performing a reset on the entire electronic device or on the component with the stuck slave controller. Instead, the stuck condition is detected, preferably by sensing a continued logical low state 36b of the data signal 30, and thereafter generating an artificial clock signal 50 and applying the artificial clock signal 50 to the clock conductor 18. The artificial clock signal 50 contains the same pulses 36a and low level intervals 36b as the cycles 36 of the normal clock signal 32 (FIG. 3B). Pulses 36a from the artificial clock signal 50 are applied to the stuck bus controller to advance the stuck controller through the uncompleted transaction until it delivers a logical high level signal 34a as the data signal 30 (FIG. 3A).

The resulting logical high level on the data conductor 16, combined with the normal logical high level on the clock conductor 18 caused by the power terminal 46 and resistor 44 after delivering one artificial clock cycle, permits any master bus controller to recognize an idle condition on the serial bus, and thereafter initiate normal functionality on the serial bus. Of course, the transaction in progress when the stuck condition occurred will not have been completed reliably, but the normal functionality of the serial bus is resumed. In this manner, the data loss and the other undesirable consequences are avoided, in distinction to the contrary situation which would result by performing a reset on the entire electronic device 10 or the component 12 with the stuck slave controller.

Figure 4:
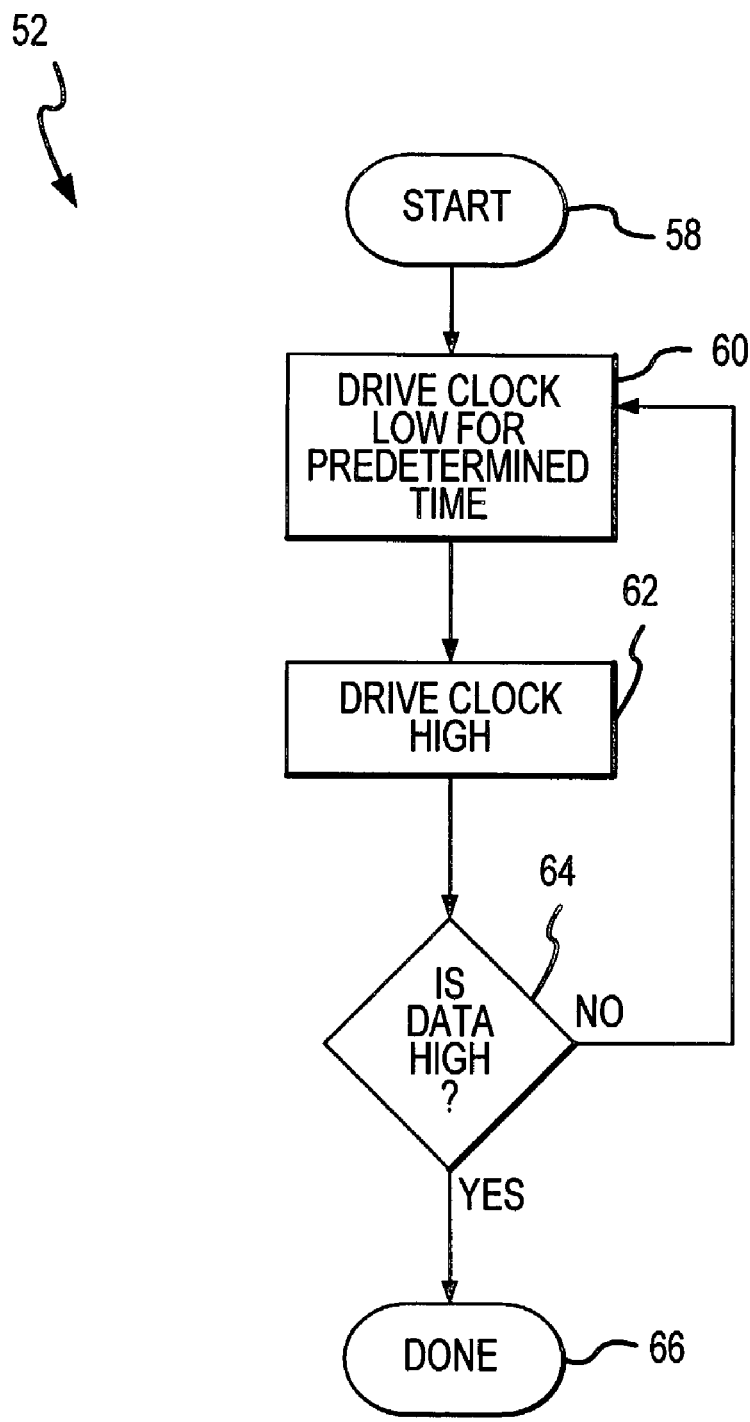
FIG. 4 is a flowchart illustrating a sequence of functions performed in a routine to release a stuck condition of the serial bus shown in FIGS. 1 and 2.

One technique at generating the requisite number of clock cycles 36 of the artificial bus clock signal 50 to release the slave controller 20 from its stuck condition, so that normal serial bus functionality can resume, is a release routine illustrated by the program flow 52 shown in FIG. 4. The release routine 52 is executed by the microcontroller 26 of the component controller 22 of a master bus controller, based on instructions contained in its memory 28 (FIG. 2). As illustrated in FIG. 4, each of the steps or functions of the release routine 52 is designated by a separate reference number. Execution of the release routine 52 shown in FIG. 4 progresses only after a stuck condition has been detected.

The release routine 52 begins at 58. In executing the release routine 52, the microcontroller 26 of the component controller 22 supplies logical low and high signals on a conductor 54 which is connected to a general input/output pin of the microcontroller 26, as shown in FIG. 2. The logical low and high signals create a single clock cycle 36 of the artificial bus clock signal 50 (FIG. 3A). The conductor 54 is connected to the bus clock conductor 18 of the serial bus 14, and the cycle 36 of the artificial bus clock signal 50 is applied to the clock conductor 18 of the serial bus 14 by the conductor 54. Driver transistors (not shown) which are connected to the general input/output pin of the microcontroller 26 also have an open drain configuration, as do the driver transistors (also not shown) of the bus controllers 20, thereby allowing the microcontroller 26 to create the artificial clock signal 50 and apply it to the clock conductor 18 in the same manner that each master controller of the serial bus creates the bus clock signal 32.

The microcontroller 26 creates a single cycle 36 of the artificial clock signal 50 by driving a logical low level signal on the conductors 54 and 18 for a predetermined time sufficient to define the width of the logical low interval 36b of the clock cycle 36 (FIG. 3B), as shown at 60. Thereafter, the microcontroller 26 establishes a logical high level signal on the conductors 54 and 18 for another predetermined time sufficient to define the width of a pulse 36a of a clock cycle 36 (FIG. 3B), as shown at 62. The performance of the steps 60 and 62 creates a complete clock cycle 36 of the artificial clock signal 50.

The stuck slave controller responds to the pulse to the artificial clock cycle created by executing steps 60 and 62, to advance or increment to the next data bit 34 or the acknowledge bit 40 of the uncompleted transaction in progress when the stuck condition occurred and to transmit that next bit 34 or 40 (FIG. 3A). The logical level of the signal on the data conductor 16 may change from the logical low state to the logical high state, if the next bit 34 or 40 transmitted by the stuck slave controller is a logical high level 34a (FIG. 3A). On the other hand, if the next data bit 34 of the data byte 38 transmitted by the stuck slave controller is also at a logical low level 34b (FIG. 3A), the signal on the data conductor 16 will remain stuck at the logical low level.

To determine whether the single cycle 36 (FIG. 3B) of the artificial clock signal 50 changed the logical low signal level on the data conductor 16 to a logical high level, the microcontroller 26 senses the logical signal level on the data conductor 16 (FIG. 2) at step 64. The logical level of the signal on the data conductor 16 is sensed through a conductor 56 which connects the data conductor 16 of the serial bus to another general input/output pin of the microcontroller 26 (FIG. 2). The microcontroller 26 samples the voltage level on the conductor 56, thereby determining the logical level of the signal on the data conductor 16.

If the determination at 64 reveals that the data signal 32 remains at the logical low level, the program flow loops from step 64 back to step 60. Steps 60 and 62 are again performed to create another cycle of the artificial clock signal, and to cause the stuck slave controller to again advance to supplying the next bit 34 or 40 of the uncompleted transaction. Again, the level of the signal on the data conductor 16 is sensed to determine, at step 64, whether it is at the logical high level. The release routine program flow 52 loops through steps 60, 62 and 64 in this manner until a logical high level data signal occurs on the data conductor as determined at step 64.

If all of the remaining bits 34 of the eight bit byte 38 (FIG. 3A) of data transferred in response to the pulses of the artificial clock signal (FIG. 3A) are at a logical low level, a logical high level data signal will nevertheless result when the stuck slave controller advances to the ninth acknowledge bit 40 (FIG. 3A) of the transaction. The stuck slave controller, having functioned as a transmitter during the uncompleted stuck transaction, establishes a logical high level on the data conductor so that the normal acknowledge signal can be communicated from the receiver master controller. The master controller, having been reset and therefore not in communication synchronism with the slave controller, will not deliver the acknowledge bit. Instead, the logical level on the data conductor will remain high as a result of the bias supplied by the power terminal 46 and resistor 42 (FIG. 2). Thus, at most, the recovery routine 52 should normally not loop through steps 60, 62 and 64 more than nine times in order to release the stuck slave controller, because nine cycles of the artificial clock signal 50 will complete any transaction, including the transaction which was in progress when the stuck condition occurred. However, if for some reason the stuck controller does not release after nine complete cycles of the artificial clock signal, the release routine 52 will continue looping in this manner until the stuck slave controller delivers a logical high signal on the data conductor 16.

If one of the data bits 34 of the data signal 30 happens to be at a logical high level before the entire transaction is completed, the logical high level of that data bit is sufficient to bring the signal level on the data conductor 16 to the high level so that an idle condition of the bus will be recognized by the master controller as a result of the artificial clock signal assuming a high level after creating the cycle by executing the steps 60 and 62. Under these conditions, the master controller will recognize the bus idle condition and thereafter progress with normal functionality to initiate subsequent transactions in the normal manner. Of course, the transaction in progress when the stuck condition occurred will not have been completed, but the normal error recognition and error recovery features of the communication protocol will recognize the failure of that transaction. Thereafter, with the serial bus in normal working condition, the previously failed transaction can be retried and completed.

Once the release routine 52 recognizes, at step 64, that a logical high level data signal 30 exists on the data conductor 16, the release routine is completed at step 66. The logical high level data signal, combined with the normal logical high level clock signal which exists after each application of the artificial clock cycle, permits a master bus controller to initiate another transaction so that normal functionality of the serial bus is resumed. It may also be desirable to cause the master controller to issue start and stop signals with no data signal 30 between them after releasing the bus from the stuck condition. Issuing the start and stop signals has the effect of unambiguously clearing the functionality of all of the bus controllers to establish an idle bus state, thereby assuring that the bus is ready to communicate further transactions normally.

Figure 5:
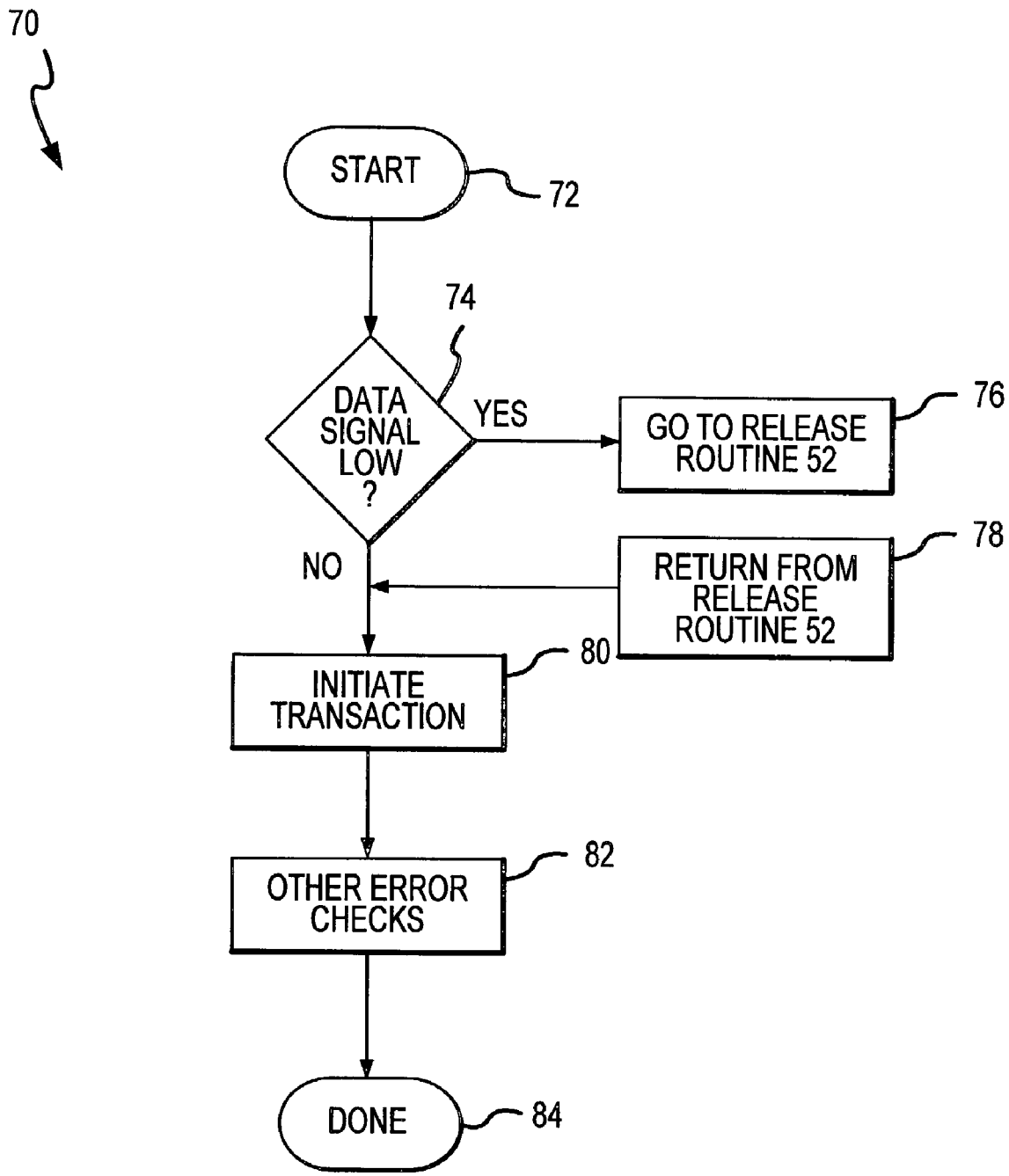
FIG. 5 is a flowchart illustrating a sequence of functions performed to detect a stuck bus condition, to release the stuck bus condition by performing the release routine shown in FIG. 4, and to continue performing normal transactions on the serial bus shown in FIGS. 1 and 2 after the stuck condition has been released, which is useful primarily in a single master serial bus.

In executing the program flow 52 shown in FIG. 4, the microcontroller 26 functions both as a generator of the artificial clock signal 50 and to detect a stuck condition of the serial bus. The stuck condition of the bus is also determined by the microcontroller 26 of the component controller 22, from instructions contained in its memory 28 (FIG. 2). One example of program flow 70 executed detect a stuck bus condition is shown in FIG. 5. The program flow 70 is primarily useful for a single master serial bus.

In general, the program flow 70, shown in FIG. 5, starts at step 72 and progresses to step 74. At step 74, a determination is made as to whether the data signal 30 on the data conductor 16 is at a low logical level. The program flow 70 is commenced before initiating a transaction. If the determination at 74 is affirmative, meaning that the data signal 30 is at a logical low level, a stuck bus condition is indicated. The program flow thereafter goes to 76 to execute the release routine 52 beginning at step 58 and completing at step 66 (FIG. 4). Thereafter, the program flow returns at 78. Of course, if the determination at 74 is negative, indicating a high level of the data signal, which is consistent with an idle bus, a normal transaction 80 may thereafter be initiated.

A negative determination at 74, or a return at 78 from the release routine 52, causes the normal transaction to initiate at 80. The transaction initiated at 80, progresses normally in accordance with the serial bus communication protocol. Normal functionality should prevail during the transaction because the stuck slave controller will have been released from the stuck condition by executing the release routine 52 (FIG. 4) between the steps 76 and 78, or the bus was not in a stuck condition in the first instance. After the transaction has been initiated at 80, the normal error checks will be performed in accordance with the communication protocol at 82. The error checks at 82 indicate whether the transaction was successfully completed or not, and thereafter the transaction is terminated at step 84. If the error checks at 82 indicate a failed transaction, the necessity to retry the failed transaction will be established at step 82. The failed transaction can be attempted at a later time in accordance with the communication protocol, by again executing the program flow 70.

Determining a stuck condition in a multi-master serial bus is somewhat more complex. In a multi-master serial bus, the determination of a stuck bus condition cannot be based strictly on the sensed level of the data signal 30, because another master on the serial bus may be performing a normal transaction. If, at the instant when the signal level on the data conductor was sensed, a logical low level data signal existed, the detection of the low logical level data signal would falsely indicate a stuck bus condition. In other words, detecting the low logical level would simply detect a part of a normal transaction performed by another master controller. To avoid detecting a condition which falsely indicates a stuck bus, the level of the data signal must be sensed over time. Detecting the level of the data signal over time need only occur in a multi-master serial bus. In a single master serial bus, the determination of logical level of the data signal should conclusively, demonstrate a stuck bus condition because no other transaction should be in progress, and a logical low level of the data signal when the data signal should be at a high logical level indicates a stuck bus.

Figure 6:
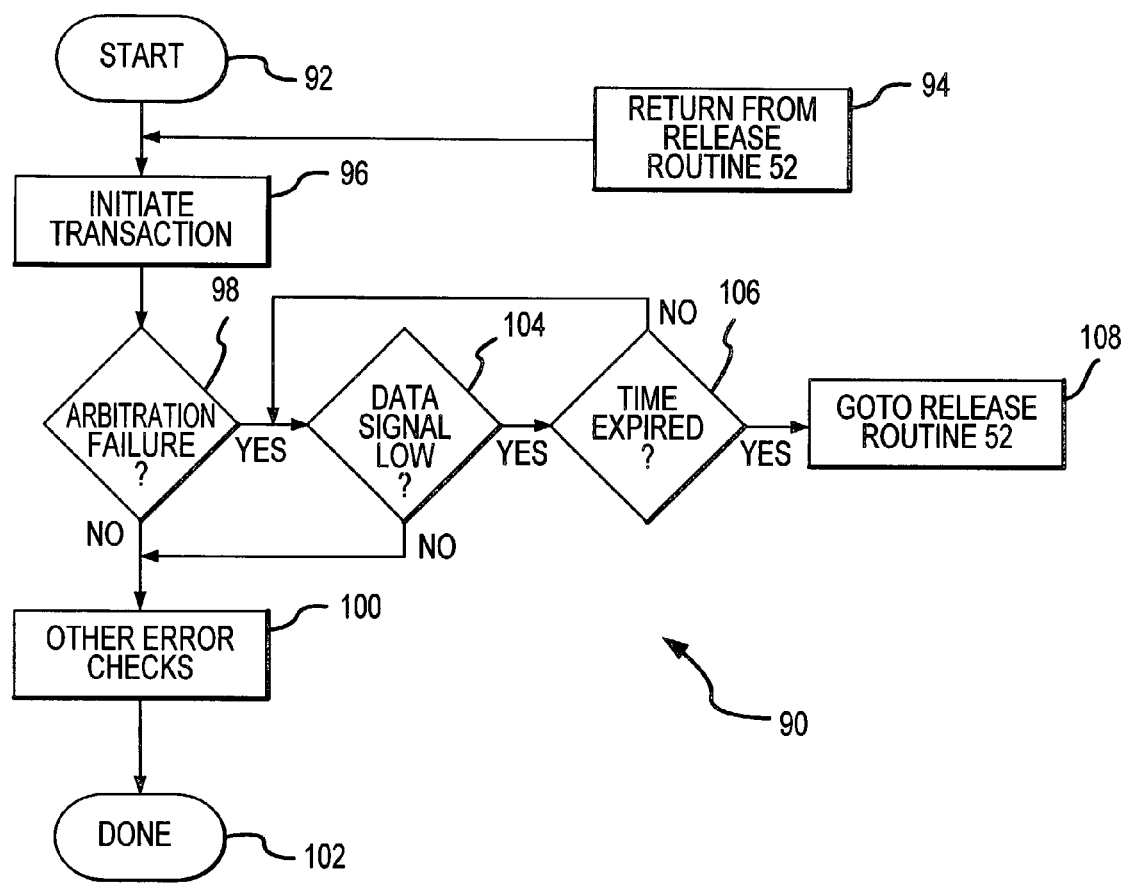
FIG. 6 is a flowchart illustrating a sequence of functions performed to detect a stuck bus condition, to release the stuck bus condition by performing the release routine shown in FIG. 4, and to continue performing normal transactions on the serial bus shown in FIGS. 1 and 2 after the stuck condition has been released, which is useful primarily in a multi-master serial bus.

The program flow shown at 90 in FIG. 6 is used to determine a stuck bus condition in a multi-master serial bus. The program flow 90 begins at 92 and progresses to the step 96. A return at 94 from executing the release routine 52 (FIG. 4), also begins the program flow 90 at the step 96. At step 96, one of the master controllers of the multi-master serial bus initiates a transaction following the normal communication protocol of the serial bus. The normal communication protocol in a multi-master serial bus involves an arbitration determination at 98 after a transaction has been initiated. An arbitration determination at 98 is necessary because another master controller may have also initiated a transaction at approximately the same time. Only one master controller may perform one transaction at a time. If the serial bus is not being used by another master controller to perform a transaction, the determination at 98 is negative, and the transaction initiated at 96 will progress to completion. At step 100, the normal error checks of the communication protocol are performed with respect to the transaction, and then the program flow 90 will complete at 102. On the other hand, an affirmative determination at 98 indicates that the transaction failed as a result of the serial bus being busy as a result of another master controller initiating or performing a transaction at the same time. The bus may also be indicated to be busy if a slave controller is stuck in a state where it is driving the data signal to the logical low level.

If the determination at 98 affirmatively indicates an arbitration failure, the program flow 90 progresses to the determination at 104. At 104, the microcontroller 26 senses the logical level of the data signal on the data conductor 16 over the conductor 56 (FIG. 2). An affirmative determination at step 104 moves to step 106, where a timing event is initiated. So long as a predetermined time has not expired, the program flow moves from step 106 back to step 104 for a further determination of the logical level of the data signal. So long as the data signal is determined at 104 to remain in the low level for the duration of the predetermined time interval established at 106, the program flow loops between steps 106 and 104. However, when the time duration established at 106 expires, and the data signal has been determined to have been logically low continuously for that time interval 106, a stuck bus condition is indicated. Under these conditions, the program flow 90 progresses to 108 where the release routine 52 (FIG. 4) is executed to release the bus of the stuck condition. Once the stuck bus condition has been released at 66 (FIG. 4), the release routine returns to the program flow 90 at 94. Thereafter, normal functionality of the multi-master serial bus should progress.

If the determination at 104 is negative, the program flow suggests that the arbitration failure determined at 98 was a result of contention of two master controllers attempting to initiate a transaction on the serial bus at approximately the same time, and the arbitration failure at 98 was not the result of a stuck bus condition caused by a logical low level data signal. In addition, the determinations at 104 and 106 will identify the condition where the data signal happened to occupy a logical low level state during a normal ongoing transaction. The amount of time established at 106, during which the determinations at 104 and 106 will be made, is sufficient for a normal transaction to complete and release the signal level on the data conductor to a logical high state. The high logical state on the data conductor will be recognized by the determination at 104, causing a transition to step 100. Thus, the determinations at 104 and 106 during the predetermined time established by the determination 106 distinguish normal bus transactions and activity from a stuck bus condition. It is only after the affirmative determinations at 104 and 106 have been made that the stuck bus release routine 52 (FIG. 4) be performed as a result of executing the step 108. Of course, once the stuck bus condition has been released, the program flow returns at step 94 to allow further normal transactions on the normal multi-master serial bus.

If all of the master bus controllers of a multi-master serial bus have the capability to communicate, independently of the serial bus itself, when any one of those multiple master controllers is involved in performing a transaction, that additional information combined with the program flow 70 illustrated in FIG. 5 can be used to detect a stuck bus condition in a multi-master serial bus. For example, if the communication among the multiple masters indicates that none of them is involved in performing a transaction, but the program flow shown in FIG. 5 reveals that the data signal on the data conductor he is in a logical low level, a stuck bus condition would be indicated.

When the stuck slave controller is advanced to drive the output signal to a logical high level, and the master controller responds by initiating a new transaction in the manner described above, the stuck bus controller will reset to a normal state of functionality even though the transaction may remain uncompleted. The normal communication protocol of a slave controller will recognize the start condition of a new transaction issued by the master controller. Upon recognizing the start condition, the slave controller immediately resets to respond to a newly-initialized transaction. Moreover, before the new transaction is fully initialized after a stuck bus condition, it may be desirable to issue start and stop commands as discussed above to signify the completion of a dummy transaction and to unambiguously reset all of the bus controllers to ensure that normal bus functionality is established. Thereafter the next legitimate transaction can be initialized.

Although the program flows 52, 70 and 90 illustrated in FIGS. 4, 5 and 6, respectively, have been described in the context of the microcontroller 26 executing programmed instructions, it is also possible that the program flow can be performed by programmed logic circuitry associated with the master controller(s), as can be understood by reference to FIG. 2. Moreover, depending upon the particular functionality of each master bus controller 20 and the degree of interaction which the component controller 22 has with the bus controller 20, it may not be necessary to extend the conductors 54 and 56 externally between the clock and data conductors 18 and 16 and the general-purpose input/output pins of the microcontroller 26. Instead, the microcontroller 26 may be able to interact sufficiently with the master bus controller 20 to sense the signal levels on the data and clock conductors of the serial bus and also to stimulate the drivers within the bus controllers 20 to deliver the artificial clock signal 50 in the same manner that those drivers deliver the normal clock signal 32.

The conditions which cause a slave bus controller to place the serial bus into a stuck state have been discovered, and techniques for releasing the slave controller from the stuck state have been described. As a consequence, it is not necessary to release the stuck state of the serial bus by executing a reset of the entire electronic device or the component to which the stuck slave controller is connected. By avoiding the reset, and instead by applying a sufficient number of pulses from an artificial clock signal to advance the data signal from the stuck slave controller to a logical high level, normal serial bus functionality can proceed without losing important data and other critical information. A normal reset of one of the components of the electronic device will achieve its intended functionality without creating the unintended consequence of disabling the entire serial bus. Many other advantages and improvements will be apparent upon gaining a complete understanding and appreciation of the present invention.

Preferred embodiments of the present invention and many of its improvements have been described with a degree of particularity. This detailed description is not necessarily intended to limit the scope of the invention; instead, the scope of the invention is defined by the following claims.

The invention claimed is:

1. A method of releasing a bus controller from a stuck condition in a serial bus of the type having a plurality of bus controllers and where a clock signal is normally applied in coordination with a data signal when performing a transaction in accordance with a serial bus communication protocol, comprising:

detecting a stuck condition where one bus controller is continuously applying a data signal and the clock signal is absent; and applying an artificial clock signal to the stuck bus controller to advance the data signal supplied by the stuck bus controller to a predetermined logical level at which the communication protocol permits a transaction to initiate.

2. A method as defined in claim 1, further comprising:
applying the artificial clock signal until the stuck bus controller supplies a data signal at a predetermined level which permits initiating a new transaction in accordance with the communication protocol.

3. A method as defined in claim 2, further comprising:
terminating application of the artificial clock signal after the stuck controller supplies the data signal at the predetermined level which permits initiating the new transaction.

4. A method as defined in claim 3, further comprising:
initiating a new transaction after the stuck controller supplies the data signal at the predetermined level; and
applying the normally applied clock signal to initiate the new transaction.

5. A method as defined in claim 1, further comprising:
detecting the stuck condition as occurring in an uncompleted transaction; and
applying the artificial clock signal to complete the uncompleted transaction.

6. A method as defined in claim 5, further comprising:
terminating the application of the artificial clock signal after completing the uncompleted transaction; and
applying the normally applied clock signal after completing the uncompleted transaction.

7. A method as defined in claim 1, further comprising:
detecting the stuck condition as occurring in an uncompleted transaction in progress; and
applying the artificial clock signal to advance the stuck controller within the uncompleted transaction until the stuck bus controller supplies a data signal at the predetermined logical level at which the communication protocol permits a transaction to initiate.

8. A method as defined in claim 1, further comprising:
resuming the application of the normally applied clock signal and ceasing to apply the artificial clock signal after the stuck controller supplies the data signal at the predetermined logical level at which the communication protocol permits a transaction to initiate.

9. A method as defined in claim 8 wherein the normally applied clock signal and the artificial clock signal each have cycles, and a predetermined number of clock signal cycles are required to complete a transaction, the method further comprising:
detecting the stuck condition as occurring during an uncompleted transaction in progress when the stuck condition occurred; and
advancing the stuck controller to the predetermined logical level at which the communication protocol permits a transaction to initiate by applying a number of cycles of the artificial clock signal less than the predetermined number of cycles required to complete a transaction.

10. A method as defined in claim 9, further comprising:
applying one cycle of the artificial clock signal at a time to advance the stuck controller; and
ceasing to apply any more cycles of the artificial clock signal upon the first occurrence of the stuck controller supplying the data signal at the predetermined logical level at which the communication protocol permits a transaction to initiate.

11. A method as defined in claim 10, further comprising:
applying enough cycles of the artificial clock signal to complete the uncompleted transaction.

12. A method as defined in claim 1, further comprising:
detecting the stuck condition of the bus controller by sensing a characteristic of the data signal.

13. A method as defined in claim 12, further comprising:
detecting the stuck condition by sensing an absence of change in logical level of the data signal.

14. A method as defined in claim 12, further comprising:
detecting the stuck condition by sensing a continuous logical level of the data signal.

15. A method as defined in claim 12, further comprising:
detecting the stuck condition by sensing a continuous logical level of the data signal over a predetermined time.

16. A method as defined in claim 15 wherein at least two bus controllers of the serial bus have the capability to initiate transactions in accordance with the communication protocol.

17. A method as defined in claim 1 wherein the serial bus is of the type in which a transaction is initiated by a master bus controller to a slave bus controller, and the master bus controller supplies the normally applied clock signal to advance the slave bus controller through the transaction initiated by the master bus controller, the method comprising:
detecting the stuck condition of the slave bus controller arising from the master bus controller abnormally terminating the clock signal normally applied to the slave bus controller while a transaction is in progress and uncompleted.

18. A method as defined in claim 17, further comprising:
applying the artificial clock signal to the stuck slave bus controller in substitution for the clock signal normally applied by the master bus controller to the slave bus controller, upon detecting the stuck condition.

19. A method as defined in claim 18 wherein the serial bus is of the type in which the data signal comprises data bits, the normally applied clock signal has cycles, the data bits of the data signal are supplied in time synchronism with the cycles of the normally applied clock signal when performing a transaction; the method further comprising:
generating the artificial clock signal with cycles;
applying one cycle of the artificial clock signal at a time to advance the data signal supplied by the slave bus controller in the uncompleted transaction to the predetermined logical level at which the communication protocol permits the master bus controller to initiate a transaction.

20. A method as defined in claim 19, further comprising:
initiating another transaction before completing the uncompleted transaction by the master bus controller by supplying normally applied clock cycles in response to the slave bus controller supplying the data signal at the predetermined level at which the communication protocol permits the master bus controller to initiate the transaction.

21. A method as defined in claim 17, further comprising:
detecting the stuck condition of the slave bus controller arising from resetting the master bus controller during the uncompleted transaction when the slave bus controller is supplying the data signal at a specific logical level.

22. In a serial bus of the type in which cycles of a normally applied clock signal occur in time synchronism with data bits of a data signal when performing a transaction communicated between two bus controllers of the serial bus, an improvement for releasing one bus controller from a stuck condition occurring during a transaction, the improvement comprising:

an artificial clock signal generator connected to a bus controller and operative upon activation to generate cycles of the artificial clock signal and to apply the cycles of the artificial clock signal to the stuck bus controller in lace of the normally applied clock signal; and detection circuitry connected to a bus controller and receptive of the data bits of the data signal communicated between the two bus controllers during the transaction, the detection circuitry detecting an absence of chance in a logical level of the data signal to identify the stuck bus condition, the detection circuitry connected to the artificial clock signal generator to activate the artificial clock signal generator to generate the cycles of the artificial clock signal in response to detecting the stuck bus condition, and wherein:

the detection circuitry comprises a microcontroller connected to the bus controller which executes programmed functionality to sample the level of the data signal to detect the absence of change in the logical level of the data signal; and the artificial clock signal generator also comprises the microcontroller which also executes programmed functionality to deliver the cycles of the artificial clock signal.

23. In the serial bus as defined in claim 22, further comprising:

a component controller connected to the bus controller, and wherein:

the microcontroller is included within the component controller; and the microcontroller also executes programmed functionality to perform functions of the component controller.

24. In the serial bus as defined in claim 23, wherein:

the component controller includes a capability to reset to a known initial state in response to a reset signal applied to the component controller;

the bus controller connected to the component controller is a master bus controller which supplies the cycles of the normally applied clock signal during a transaction; and the master bus controller ceases to deliver cycles of the normally applied clock signal in response to the application of the reset signal to the component controller.

25. In the serial bus as defined in claim 24, wherein:

the master bus controller supplies the cycles of the normally applied clock signal to a slave controller during a transaction; and the slave bus controller becomes stuck during a transaction which is in progress and uncompleted at a time when the data signal is at a logical low level when the reset signal is applied to the component controller.

26. In the serial bus as defined in claim 22, wherein:

the microcontroller also executes programmed functionality to periodically sample the data signal to detect the stuck condition by a continual presence of one logical level of the data signal; and the microcontroller delivers the cycles of the artificial clock signal in response to detecting the stuck condition.

27. In a serial bus of the type in which cycles of a normally applied clock signal occur in time synchronism with data bits of a data signal when performing a transaction communicated between two bus controllers of the serial bus, an improvement for releasing one bus controller from a stuck condition occurring during a transaction, the improvement comprising:

an artificial clock signal generator connected to a bus controller and operative upon activation to generate cycles of the artificial clock signal and to apply the cycles of the artificial clock signal to the stuck bus controller in place of the normally applied clock signal; and detection circuitry connected to a bus controller and receptive of the data bits of the data signal communicated between the two bus controllers during the transaction, the detection circuitry detecting an absence of change in a logical level of the data signal to identify the stuck bus condition, the detection circuitry connected to the artificial clock signal generator to activate the artificial clock signal generator to generate the cycles of the artificial clock signal in response to detecting the stuck bus condition, and wherein:

the detection circuitry comprises programmed logic circuitry connected to the bus controller which executes logic functionality to sample the level of the data signal to detect the absence of change in the logical level of the data signal; and the artificial clock signal generator responds to the programmed logic circuitry detecting the absence of change in the logical level of the data signal to deliver the cycles of the artificial clock signal.

* * * * *